No. 769,578. PATENTED SEPT. 6, 1904.
R. B. WHITE.
CORN HARVESTER.
APPLICATION FILED OCT. 30, 1903.
NO MODEL.
2 SHEETS—SHEET 1.
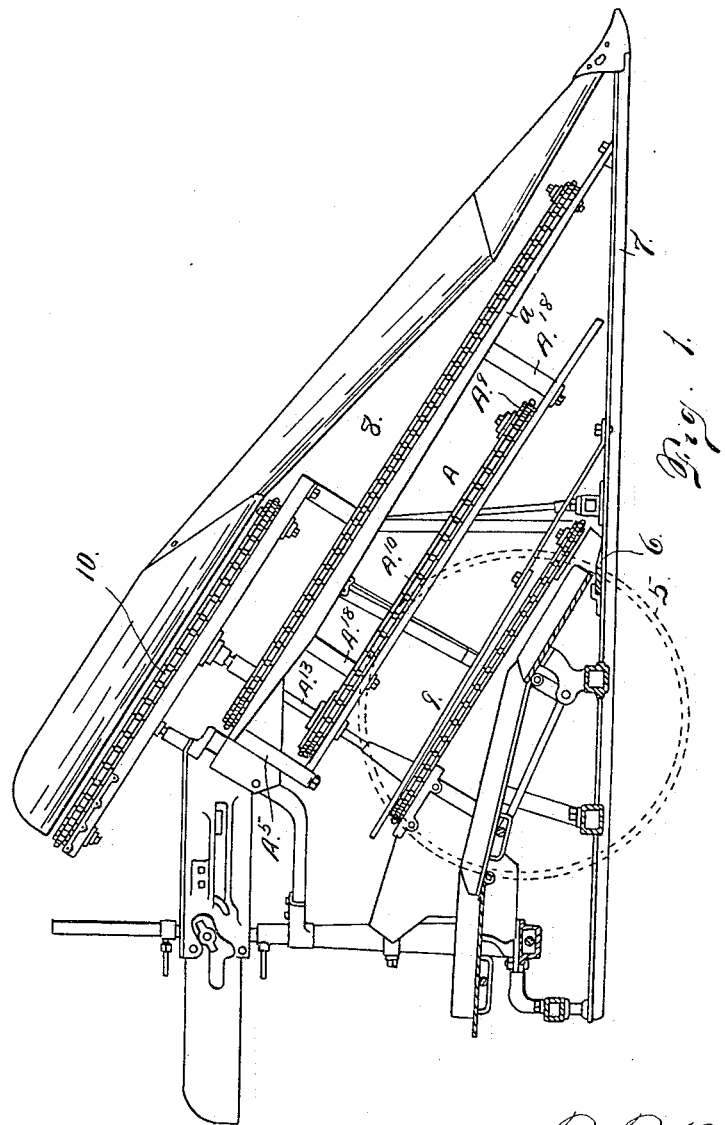

No. 769,578. PATENTED SEPT. 6, 1904.
R. B. WHITE.
CORN HARVESTER.
APPLICATION FILED OCT. 30, 1903.
NO MODEL. 2 SHEETS—SHEET 2.
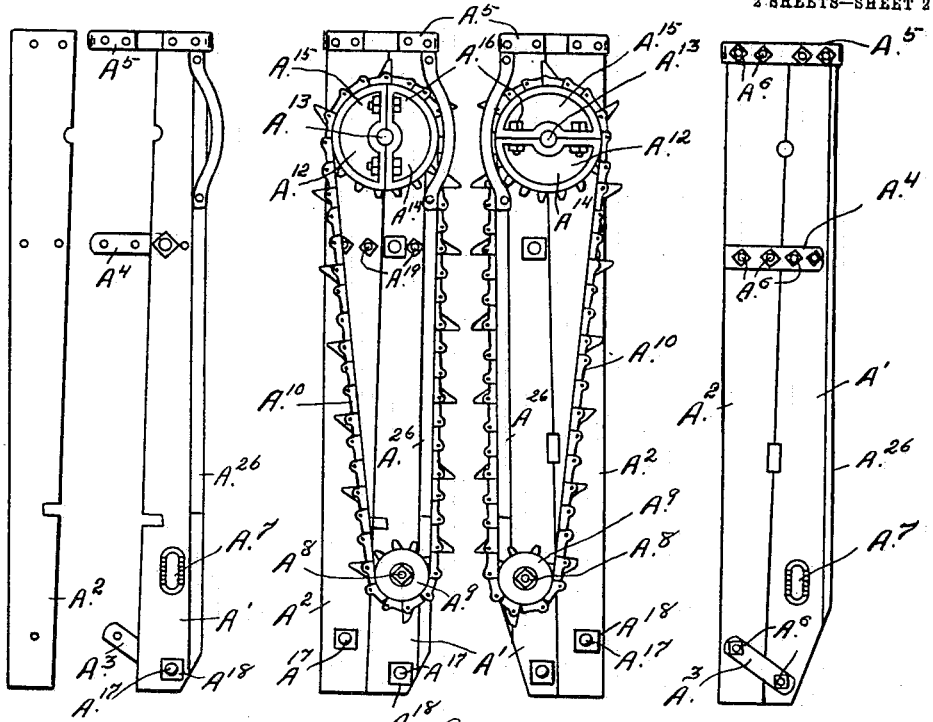
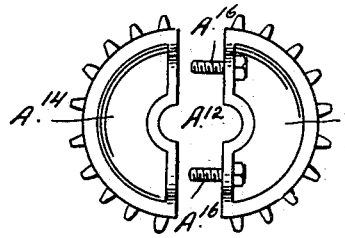
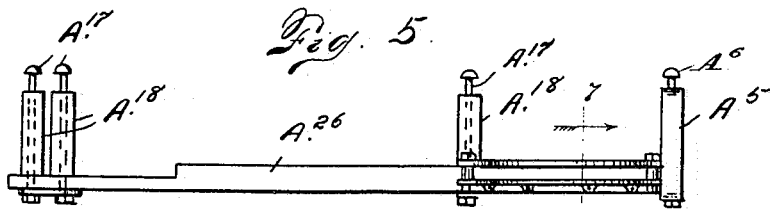
Witnesses
Otto E. Hoddick.
Dena Nelson.
R. B. White.
Inventor
Attorney No. 769,578.	Patented September 6, 1904.

UNITED STATES PATENT OFFICE.

RICHARD B. WHITE, OF WINCHESTER, TENNESSEE.

CORN-HARVESTER.

SPECIFICATION forming part of Letters Patent No. 769,578, dated September 6, 1904.

Application filed October 30, 1903. Serial No. 179,252. (No model.)

*To all whom it may concern:*

Be it known that I, RICHARD B. WHITE, a citizen of the United States of America, residing at Winchester, in the county of Franklin and State of Tennessee, have invented certain new and useful Improvements in Corn-Harvesters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in corn-harvesters; and its object is to provide an attachment for the ordinary construction known as the "vertical" class of corn-harvesters whereby the said machine is adapted for use with short corn, or corn that is not of sufficient height to properly reach the upper conveyer. This construction of harvester is mounted on ground-wheels and is provided with a knife, located below and adapted to cut the stalks of corn, and two conveyers, each conveyer consisting of two endless chains mounted on wheels provided with suitable supporting boards or plates, the two boards of each conveyer being separated to allow the corn-stalks to pass between them, while the said stalks are acted on by the conveyer-chains on opposite sides.

My improvement relates to placing an additional conveyer between the two conveyers now employed and making the additional conveyer of such construction that it can be readily attached to and removed from the machine, according as it is necessary to harvest short or long corn. When the corn is of sufficient height to properly reach the upper conveyer or conveyers of the machine, my attachment need not be employed; but when the corn is shorter the attachment may be quickly and easily applied.

Having briefly outlined my improved construction, as well as the function it is intended to perform, I will proceed to describe the same in detail, reference being made to the accompanying drawings, in which is illustrated an embodiment thereof.

In the drawings, Figure 1 is a vertical longitudinal section taken through a vertical corn-harvester equipped with my improvement. Fig. 2 is a top or plan view of my improvement, showing the two members of the conveyer arranged in operative relation with each other. Fig. 3 is an underneath or bottom view of the board or support forming a part of one member of the conveyer. Fig. 4 is a top view of the same, the two parts of the board being separated. Fig. 5 is a detail view of a divided gear employed in connection with my improvement. Fig. 6 is an edge view of the improvement shown in detail. Fig. 7 is a section taken on the line 7 7, Fig. 6, viewed in the direction of the arrow.

The same reference characters indicate the same parts in all the views.

Let the numeral 5 designate the ground-wheels, and 6 the stalk-cutters, mounted on the frame 7 of the machine and in a suitable position for cutting the stalks of corn.

Let 8 designate one of the conveyers, and 9 the lower conveyer of the machine as at present constructed. This machine is also provided with a short top-conveyer 10, which catches the tops of very tall corn.

My improved construction may be designated in its entirety by the letter A and consists of two members. Each of these members is provided with a supporting-board consisting of two parts A' and $A^2$, respectively, which, as shown in the drawings, are connected by straps $A^3$, $A^4$, and $A^5$. The strap $A^5$ is U-shaped and extends to the supporting-board of the conveyer above, thus forming both a connecting-strap for the two parts A' and $A^2$ and a supporting-bracket. Bolts $A^6$ are employed in connection with these straps, whereby the two parts A' and $A^2$ are securely held in place. The part A' of each member is provided with an elongated opening $A^7$, through which passes a bolt $A^8$, upon which is journaled an idler-sprocket $A^9$, around which passes a conveyer-chain $A^{10}$, which chain also passes around a sectional driving-sprocket $A^{12}$, mounted on an operating-shaft $A^{13}$, with which the machine is already equipped and which operating-shaft is used in connection with the conveyers 8 and 9. The two parts $A^{14}$ and $A^{15}$ of the sprocket are connected by bolts $A^{16}$. Each part $A'$ is provided with a guide $A^{26}$ for the conveyer-chain. Each of these conveyer members is connected with a board $a$ of the uppermost conveyer 8 by means of bolts $A^{17}$ passing through hollow spacing-blocks $A^{18}$, which separate the conveyer 8 above.

In applying my improved apparatus the parts $A'$ and $A^2$ are placed in position and fitted around the shaft $A^{13}$, after which the bolts $A^6$ are applied to the straps $A^3$, $A^4$, and $A^5$, whereby the parts $A'$ and $A^2$ are connected together. The split sprockets $A^{12}$ are then rigidly secured to the shafts $A^{13}$ by the bolts $A^{16}$, the sprockets $A^9$ are put in place, and the conveyer-chains $A^{10}$ applied. The sprockets $A^9$ are then regulated by adjusting the bolt $A^8$ in the slot $A^7$, whereby the conveyer-chains are made of the proper tension. Then as the machine is put in operation the same shaft $A^{13}$ which operates the conveyers 8 and 9 also operates my auxiliary conveyer 10. As heretofore intimated, the machine will then be equipped for use with corn not long enough to be properly acted on by the conveyer 8. In removing my improved construction the steps heretofore specified as necessary in putting it on are simply reversed, and further explanation on this subject is not believed necessary.

It may be stated that in a corn-harvester of this character the object is to keep the stalks in an upright position and the function of the conveyers is to move them along in this position after they are cut off by the cutter 6 until they can be bound by the use of an attachment already on the machine and which it is not necessary to describe herein.

Having thus described my invention, what I claim is—

1. A corn-harvester provided with a conveyer consisting of two separated members, each member consisting of a sectional board or plate suitably connected, sprockets mounted thereon, conveyer-chains engaging the sprockets, and an operating-shaft, one of the sprockets being divided to allow it to be readily applied to and detached from the shaft, substantially as described.

2. In a corn-harvester, the combination with an upper-conveyer support, of an auxiliary conveyer, bolts connecting the auxiliary conveyer with the upper-conveyer support, and hollow spacing-blocks located between the lower-conveyer and the upper-conveyer support and through which the said bolts pass.

3. The combination in a corn-harvester, with an upper-conveyer support, of an auxiliary conveyer suitably connected with the upper-conveyer support and extending parallel therewith, the auxiliary conveyer consisting of two members, each member comprising a board or plate consisting of two parts suitably connected, an operating-shaft, a divided sprocket made fast upon the operating-shaft, another sprocket adjustably connected with the board or plate, and conveyer-chains mounted on the said sprockets.

In testimony whereof I affix my signature in presence of two witnesses.

RICHARD B. WHITE.

Witnesses:
 DENA NELSON,
 MARY C. LAMB.